United States Patent [19]
Pressman et al.

[11] 3,977,323
[45] Aug. 31, 1976

[54] ELECTROSTATIC PRINTING SYSTEM AND METHOD USING IONS AND LIQUID AEROSOL TONERS

[75] Inventors: Gerald L. Pressman, San Jose; David E. Blake, Woodside; Hugh F. Frohbach, Sunnyvale, all of Calif.

[73] Assignee: ElectroPrint, Inc., Cupertino, Calif.

[22] Filed: June 2, 1975

[21] Appl. No.: 583,076

Related U.S. Application Data

[63] Continuation of Ser. No. 425,750, Dec. 18, 1973, abandoned, and a continuation-in-part of Ser. No. 101,681, Dec. 28, 1970, Pat. No. 3,779,166.

[52] U.S. Cl. .................................. 101/426; 101/1; 101/114; 101/DIG. 13; 355/3 R
[51] Int. Cl.² ........................................ G03G 13/06
[58] Field of Search ............ 101/DIG. 13, 426, 114, 101/129, 1; 197/1 R; 355/3

[56] References Cited
UNITED STATES PATENTS

| | | | |
|---|---|---|---|
| 3,625,604 | 12/1971 | Pressman ............................ | 355/3 R |
| 3,647,291 | 3/1972 | Pressman et al. ................... | 355/3 R |
| 3,689,935 | 9/1972 | Pressman et al. ............. | 101/DIG. 13 |
| 3,697,164 | 10/1972 | Pressman et al. ...................... | 355/4 |
| 3,779,166 | 12/1973 | Pressman et al. ................... | 355/3 R |
| 3,797,926 | 3/1974 | Fotland et al. ...................... | 355/3 R |

*Primary Examiner*—Edgar S. Burr
*Assistant Examiner*—William Pieprz
*Attorney, Agent, or Firm*—Townsend & Townsend

[57] ABSTRACT

A system for electrostatic printing including a corona source and electrode for generating a substantially uniform stream of ions in the direction of a print receiving medium and a multilayer apertured modulator interposed in the ion stream for modulating the cross-sectional flow density of ions in the stream in accordance with a pattern to be reproduced. A cloud of substantially uncharged liquid aerosol ink particles is introduced adjacent the print receiving medium whereby the modulated ion stream selectively impinges upon and charges particles in the cloud which are thereby accelerated and deposited on the print receiving medium in accordance with the pattern to be reproduced. The average surface charge density on liquid aerosol particles in the cloud is no greater than about $1 \times 10^{-6}$ coulombs/m², and preferably no greater than about $5 \times 10^{-7}$ coulombs/m². The liquid aerosol droplets are in the range of from about 0.10 micron to 50.0 microns in diameter, the range of 1.0–10.0 microns diameter being preferred.

11 Claims, 18 Drawing Figures

FIG_1

FIG_1A

FIG_2

FIG_3

FIG_4

FIG_5

FIG_5A

FIG_6

FIG_7  FIG_8  FIG_9  FIG_10  FIG_11

FIG_8A

FIG_12

FIG_13

FIG_14

FIG_15

ELECTROSTATIC PRINTING SYSTEM AND METHOD USING IONS AND LIQUID AEROSOL TONERS

This is a continuation of application Ser. No. 425,750, filed Dec. 18, 1973 and now abandoned and is a continuation-in-part of U.S. patent application Ser. No. 101,681, filed Dec. 28, 1970, entitled "Electrostatic Printing System and Method Using Ions and Toner Particles", now U.S. Pat. No. 3,779,166 issued Dec. 18, 1973.

This invention relates to a new and improved system for electrostatic reproduction, and in particular to an improvement in modulated aperture non-contact electrostatic printing useful in a wide range of applications including document copiers, computer printouts, silent typewriters, etc., employing liquid aerosol inks.

The system of electrostatic printing referred to herein as modulated aperture non-contact electrostatic reproduction is generally set forth in U.S. Pat. Nos. 3,625,604 and 3,647,291 assigned to the assignee of the present case. According to these disclosures, there is provided in a preferred embodiment a multilayered apertured screen including at least a conductive layer and an adjacent insulative layer on which an electrostatic latent image is formed for modulating a flow of charged toner particles, ions or other printing particles directed through the apertures of the screen by an accelerating field. The minimum of two layers for the screen construction permits establishing a double layer charge on the opposite sides of the insulative layer for selectively producing overlapping lines of force or "fringing" fields within the apertures of the screen. Thus, lines of force generated by bi-polar electrostatic fields extend within the apertures of the screen and can be oriented to oppose the passage of charged particles, enhance the flow of charged particles, or be neutralized to have no effect on charged particles directed through the apertures of the screen. Thus, the double layer charge can be selectively established across the face of the screen to substantially completely block the passage of charged particles through certain apertures, enhance and accelerate the passage of charged particles through other apertures, and control the width and density of the particle stream through other apertures over a continuous spectrum. A stream or flow of charged particles directed through the screen by an overall applied accelerating field is therefore modulated to provide a cross-sectional density variation at least substantially corresponding with the image or pattern to be reproduced. The modulated stream of toner particles or other charged particles passing through the apertured screen is transferred by the overall applied electrostatic projection field across a gap or space to the print receiving medium. The pattern image formed by this non-contact printing arrangement is thereafter fixed according to known techniques if dry particles are used. If the toner particles consist of liquid aerosols the fixing step may not be necessary. Furthermore, if the charged particle stream consists of ions the ions impinge on the paper forming an electrostatic latent image which is thereafter dusted and fixed. In this latter embodiment, treated dielectric paper must be used in order to retain the electrostatic latent image formed by the ion stream.

In one approach for establishing the double layer charge or bipolar electrostatic latent image across the screen, a substantially uniform charge distribution is initially established across both sides of the insulative layer with opposite charges on the respective sides to provide fringing fields within the apertures. These fringing fields are oriented to produce blocking fields to block or partially block particles of a predetermined charge sign. By use of photosensitive insulating materials the charge distribution and therefore the blocking fields are dissipated according to a light pattern projected on the screen. The fringing fields also may be oriented to include enhancing fields which are established by additional techniques. The screen must generally be charged initially with blocking fields which block the passage of charged toner particles through the screen however. The blocking fields are thereafter selectively neutralized according to the light pattern or reversed to enhancing fields according to additional procedures, and the resulting modulation of the flow of toner particles through the screen results in certain embodiments in negative printing. In order to achieve positive printing special contact charging techniques for charging the screen and other special expedients for non-contact or field charging was used.

Other modulated aperture non-contact electrostatic reproduction systems are disclosed in commonly assigned U.S. Pat. Nos. 3,713,734, issued Jan. 30, 1973, entitled "Apparatus for Forming A Positive Electrostatic Image", and 3,694,200, issued Sept. 26, 1972, entitled "Electrostatic Modulator for Controlling Flow of Charged Particles". The foregoing patents relate primarily to two-dimensional screens, as opposed to a line printer.

Another approach to modulated aperture non-contact electrostatic printing is set forth in U.S. Pat. No. 3,689,935, issued Sept. 5, 1972, entitled "Electrostatic Line Printer", assigned to the assignee of the present case. This arrangement is particularly applicable in electronically addressed electrostatic printing and computer printout. The Electrostatic Line Printer incorporates in one embodiment, a multilayered particle modulator comprising a layer of insulating material, a continuous layer of conducting material on one side of the insulating layer, and a segmented layer of conducting material on the other side of the insulating layer. Both conductive layers can be segmented however. At least one row of apertures is formed through the multilayered particle modulator. Each segment of the segmented layer of conductive material is formed adjacent or around at least one aperture and is insulatively isolated from every other segment of the segmented conductive layer. More than one aperture may be formed through each segment. Selected potentials are applied to each of the segments of the segmented conductive layer while a fixed potential is applied to the continuous conductive layer. Charged layers are thereby established on either side of the insulating layer permitting fringing fields to be established within the modulator apertures oriented to block or enhance a flow of charged particles directed through the screen or to control the flow over a continuous range in between. The bipolar fringing fields established within the apertures are separately controllable according to the electric potentials applied to the insulatively isolated segments along the row of apertures. An overall applied field projects charged particles through the row of apertures of the particle modulator and the density of the particle stream is modulated according to the pattern of potentials applied to the segments of the segmented conductive layer. A modulated stream of charged particles impinge upon a print receiving medium interposed in the modulated particle stream and translated relative to the particle modulator to provide line-by-line or line scan printing.

In each of the above arrangements for modulated aperture non-contact electrostatic printing the two-dimensional screen or line grid modulator can be used to modulate a flow of charged toner particles or ions. When the screen or line grid modulator is used to control a flow of toner particles either dry or liquid, a toner cloud is produced from a toner source on the side of the modulator opposite the print receiving medium and an overall applied accelerating field generates a stream of toner particles toward the print receiving medium which is modulated by the interposed screen or line grid. This arrangement enables direct deposition of toner particles on any surface, regular or irregular, dielectric or conductive. However, a percentage of the toner particles charged by the toner source on the other side of the screen or line grid do not pass through the apertures but land on solid portions of the screen or line grid, or on walls of the toner supply ducts.

The use of ions in the particle flow, instead of toner marking material itself, avoids any problem of toner build-up and further permits the use of lower potentials for gating the particle stream. However, the use of an ion stream generated from a corona source for establishing an electrostatic latent image on the print receiving medium requires the use of high dielectric paper or treated paper in order to permit retention of sufficient charge magnitude in the electrostatic latent image.

It is therefore an object of the present invention to provide a modulated aperture electrostatic printing system incorporating the advantages of both modulated toner particle flow and modulated ion stream flow non-contact printing while suffering the disadvantages of neither. In order to accomplish this result the present invention generally contemplates the method of generating an ion stream in the direction of a print receiving medium, modulating the cross-sectional flow density of ions in the stream in accordance with a pattern to be reproduced, and introducing a cloud of substantially uncharged toner marking particles adjacent the print receiving medium whereby the modulated ion stream selectively impinges upon and charges toner particles in the cloud which are thereby deposited on the print receiving medium in accordance with a pattern to be reproduced.

When dry toner particles are utilized in the foregoing system, the developed image must be transported to a fixing station where heat and/or pressure are applied to permanently fix the developed image to the paper. Accordingly, when dry toner particles are employed, there is a possibility that the image will be disrupted between the time it is developed on the print receiving medium and such later time as it is permanently affixed thereto. A further difficulty is that when dry toner particles are formed into a cloud, they tend to strike against one another and against other elements of the apparatus and become tribo-electrically charged by friction. As a result, it is difficult to form a substantially uncharged cloud of dry toner marking particles. When a particle in a cloud acquires excessive charge of a single polarity, they repel one another and the cloud expands so that it is less dense. In addition, the charged particles tend to collect on the walls of the apparatus and are, thereby, lost to the printing process, or they tend to be attracted to the paper resulting in undesirable gray "background". Similarly, when a cloud of particles acquires excessive ambipolar charge, (both positive and negative charge), oppositely charged particles are attracted to one another and tend to form larger aggregate particles which drop out of the cloud, again causing a portion of the toner particles to be lost to the printing process.

We have discovered that the foregoing disadvantages are largely overcome when the cloud of marking particles is comprised of an aerosol suspension of liquid ink or other liquid marking material. Unlike toner images, images developed with inks are self-fixing in that they soak into the print receiving medium on contact and dry to become fixed without further treatment. Accordingly, there is little danger of disrupting the image between development and fixing. Additionally, there is usually no need for additional apparatus to carry out the fixing step. Further, the liquid particles do not acquire triboelectric charge when formed into a cloud or mist, so that charge levels in the cloud are easily held below acceptable limits.

Thus, the invention generally contemplates providing, in one embodiment, a corona source and spaced electrode for generating a substantially uniform ion stream, and a support for positioning a print receiving medium in the path of the ion stream. A multilayered apertured two-dimensional screen or line grid modulator is interposed in the ion stream between the source and print receiving medium for modulating the cross-sectional flow density of ions in the stream in accordance with a pattern to be reproduced. Finally, a source is provided and arranged for introducing a cloud of aerosol suspension of substantially uncharged droplets of liquid ink or other liquid marking materials adjacent the print receiving medium whereby the modulated ion stream selectively impinges upon and charges particles or droplets in the cloud. The selectively charged particles adjacent the print receiving medium are thereafter accelerated and deposited on the medium in accordance with the pattern to be reproduced.

A feature and advantage of this system is that charged toner particles need not be ducted or transported through channels in the machinery or through the screen or line grid modulator thereby avoiding toner loss and toner contamination while at the same time permitting direct toner deposition printing on the print receiving medium so that electrostatic printing can take place on any surface.

Another feature and advantage of this arrangement is that the ion stream alone passes through the screen or line grid modulator permitting the use of lower gating potentials, high frequency gate switching, and high velocity particle transport for high speed printing. Still another feature and advantage of this system is that, by utilizing liquid aerosols, the developed image affixes itself to the print receiving medium automatically upon contact, usually without further treatment and/or transport to fixing stations, thereby eliminating the need for fixing apparatus and avoiding the possibility that the developed image will be disrupted prior to becoming fixed to the paper.

Still another advantage of the present invention is that liquid aerosol clouds may be generated without generating triboelectric charge on the aerosol particles, thereby mitigating against the particles being electrostatically attracted to the paper or the walls of the printing apparatus, and tending to avoid the possibility that particles in the cloud will (a) repel each other causing the cloud to expand or (b) attract one another forming larger aggregate particles which drop out of suspension.

In a preferred form of the invention, modulation of the ion flow is accomplished using a multilayered apertured element spaced between the ion source and the accelerating electrode having at least a conductive layer and an insulative layer capable of supporting charged potentials of differing magnitude on different layers of the element for establishing the electrostatic lines of force within the apertures of the element for controlling passage of ions in accordance with a pattern to be reproduced. Thus, the preferred embodiments generally include all of the two-dimensional screen and one-dimensional line grid modulators described in the patents referred to above and assigned to the assignee of the present case.

In order to further eliminate toner contamination in the printing machinery the invention contemplates establishing an air pressure differential from one side of the modulating element to the other with the low pressure on the side adjacent the print receiving medium whereby a small air flow is established through the apertures of the modulating element to prevent the marking particles from entering the apertures. According to another aspect of the invention, air streams can be injected along the surfaces of the modulating element and positioned print receiving medium in order to provide air boundaries around the introduced cloud.

In the preferred forms, whether using the two-dimensional screen of the one-dimensional line grid modulator, the invention contemplates line-by-line or line scan printing to provide optimum control over the uniformity of marking particle distribution. A feature and advantage of this approach is that cloud uniformity is necessary only along one major dimension namely the printing line. This result, when printing with the two-dimensional screen, is accomplished as follows.

A row corona source and spaced accelerating electrode generate a substantially uniform stream of ions having a line or linear cross-sectional configuration. A multilayered apertured screen formed with a two-dimensional array of apertures for modulating the ion flow is interposed in the space between the row corona source and the accelerating electrode. The multilayered apertured screen is formed with at least a conductive layer and an insulative layer as heretofore described capable of supporting charge potentials of differing magnitude on different layers of the screen for establishing electrostatic lines of force within the apertures of the screen for controlling passage of ions. Means are provided for translating the screen across the linear cross-section stream of ions for variably modulating the line stream in accordance with the pattern of electrostatic lines of force within the apertures across the screen. At the same time a print receiving medium is supported and positioned between the modulating screen and the accelerating electrode in the path of the linear ion stream and the print receiving medium is transported across the line cross-section of the ion stream at a rate synchronized with the modulating screen. It is, of course, the relative motion of the ion stream to the modulator and print receiver which is useful, and thus, the latter two may be fixed and the ion stream translated. Finally a channel is provided for introducing a cloud of substantially uncharged marking particles into the path of the linear cross-section ion stream in the space between the translating modulating screen and the translating print receiving medium whereby the modulated linear cross-section ion stream selectively impinges upon and charges particles in the cloud which are accelerated and deposited on the print receiving medium in accordance with the pattern to be reproduced. Preferably, a velocity component is imparted to the cloud substantially equal to and in the direction of motion of the modulating screen and print receiving medium.

The system also incorporates elements for establishing an electrostatic latent image on the insulative layer of the two-dimensional modulating screen and for applying a potential to the conductive layer of the screen. In one example optical addressing is utilized to establish the electrostatic latent image and the insulative layer comprises a layer of photoconductive insulating material. The photoconductive layer is first uniformly charged and the pattern to be reproduced is optically imaged onto the photoconductive layer for selectively dissipating the charge to form an electrostatic latent image. A potential is applied to the conductive layer to provide the bipolar electrostatic latent image of fringing fields within the apertures. The screen can be formed in the configuration of an elongate web transported along a plurality of printing stations for multiple copy electrostatic printing.

According to one embodiment of the aspect of the invention the screen is formed in the configuration of a hollow cylinder and a row corona source is positioned inside the cylindrical screen with the accelerating electrode spaced from the row corona source outside the cylindrical screen. The cylindrical screen is rotated relative to the row corona source and the accelerating electrode to variably modulate the line cross-section ion flow in accordance with the pattern of electrostatic lines of force within the apertures across the screen. A print receiving medium is spaced from the cylindrical screen between the cylindrical screen modulator and accelerating electrodes and is transported across the path of the line cross-section ion flow at a rate synchronized with the rotation of the cylinder. As in the previous embodiment a channel is provided for introducing a cloud of substantially uncharged marking particles in the path of the linear ion stream and the space between the cylindrical screen surface and the print receiving medium. The cylindrical screen may also be optically addressed for establishing the double layer charge electrostatic latent image.

The invention thus generally contemplates the method of electrostatic printing comprising generating an ion stream in the direction of a print receiving medium, modulating the cross sectional density flow of ions in the stream in accordance with a pattern to be reproduced, and introducing a cloud of substantially uncharged marking particles adjacent the print receiving medium whereby the modulated ion stream selectively impinges upon and charges particles in the cloud which are deposited on the print receiving medium in accordance with a pattern to be reproduced.

The present invention contemplates that the marking particles will be liquid droplets having diameters in the range of about 0.10 to 50.0 microns but preferably in the range of from about 1.0 to 10.0 microns, in aerosol suspension. The invention further contemplates that the particles in the cloud, prior to encountering the modulated ion streams, will have an average surface charge density no greater than about $1 \times 10^{-6}$ coulombs/m² and preferably no greater than about $5 \times 10^{-7}$ coulombs/m².

Other objects, features and advantages of the present invention will become apparent in the following specification and accompanying drawings.

A. PRIOR MODULATED APERTURE SYSTEMS

Figure 1:
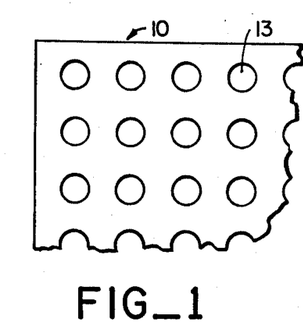
FIG. 1 is a fragmentary plan view and FIG. 1A a fragmentary side cross-sectional view of a multilayered apertured screen for modulating the flow of charged particles.
Figure 1A:
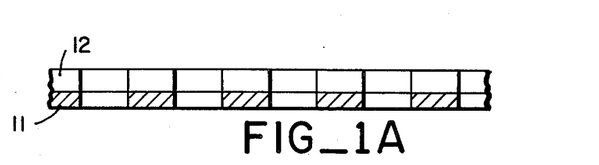
Figure 2:
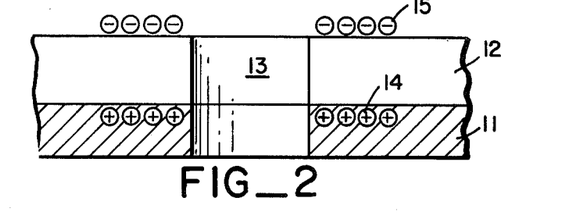
FIG. 2 is a detailed cross-sectional view of one aperture of the screen showing a portion of the double layer charge electrostatic latent image supported by the screen.
Figure 3:
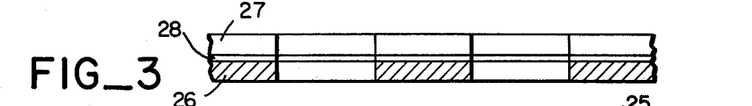
FIG. 3 is a fragmentary side cross-sectional view of another multilayered screen.

In order to more fully understand the invention, a general description of modulated aperture electrostatic printing as heretofore developed is first presented with reference to FIGS. 1–7. In FIGS. 1 and 1A is illustrated a multilayered apertured screen suitable for use in the present invention. The screen 10 generally comprises a conductive layer 11 and an insulative layer 12 with rows of holes 13 formed therethrough. As shown in more detail in FIG. 2, the construction of the screen is such that a layer of charges can be supported on either side of the insulative layer 12. Thus, a potential can be applied to the conductive layer 11 in order to supply charges 14 of a particular sign such as, for example, positive, along the side of the insulative layer 12 adjacent the conductive layer 11. A second layer of charges 15 can be established along the outer side of the insulative layer of 12 or for example opposite or negative charge around the apertures 13 of the screen. The double layer charge establishes lines of force within the apertures 13 of the screen which can be oriented to either block or enhance a flow of charged particles directed through the apertures or to control the density of particles passing through the apertures over a continuous range in between. The pattern of electrostatic lines of force established within the apertures 13 and the screen is also referred to herein as a bipolar electrostatic latent image.

Figure 4:
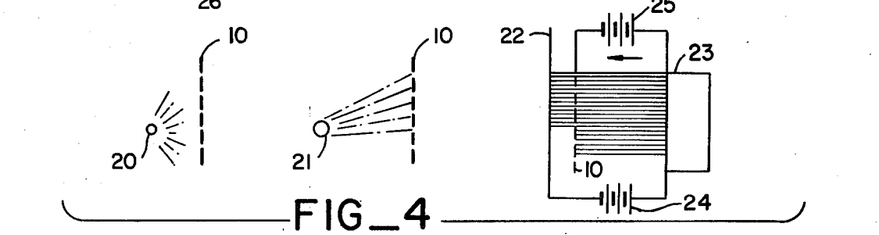
FIG. 4 is a sequence of diagrammatic views showing the steps in modulated aperture electrostatic printing.

The pattern of charges 15 on the outside of the insulative layer can be established by a variety of contact charging techniques or by optical addressing as set forth in the patent applications referred to above. By way of example the insulative layer 12 can be formed of a photoconductive insulating material. As shown in FIG. 4, the double layer screen 10 is first sprayed from a corona source 20, the photoconductive insulative layer facing the corona source, and the conductive layer maintained at some fixed potential such as ground so that a bipolar electrostatic latent image is formed across the insulative layer of the screen. The screen 10 is then exposed to light from a source 21 in a pattern in accordance with an image to be reproduced thereby selectively to dissipate the charge on the photoconductive insulative layer. This step of course occurs in a dark environment. Finally, the screen 10 is positioned adjacent a print receiving medium 22 with a toner source 23 positioned on the opposite side of the screen. A potential derived from source 24 establishes an accelerating field between the toner supply 23 and the accelerating electrode 22 so that a stream of charged toner particles is directed through the apertures of the screen 10. At the same time, a selected potential from source 25 is applied to the conductive layer of the screen to maintain the electrostatic field between the screen and source and between the screen and accelerating electrode. With blocking fields initially established across the screen, toner is permitted to pass through those apertures from which the charge on the insulative layer is dissipated by light exposure in the previous step, while the unexposed apertures continue to block the passage of charged toner particles forming a deposit of toner particles on the print receiving medium 22 in accordance with the pattern to be reproduced.

A variety of other modulating screen configurations are described in the patents referred to above. By way of example in FIG. 3 there is shown a three-layered apertured screen comprising a conductive layer 26 and a photoconductive insulating layer 27 separated by a high dielectric insulating material 28. A bipolar or double layer charged electrostatic latent image is established across the insulative layers of this screen according to a variety of charging techniques set forth in the patents referred to above.

Figure 5:
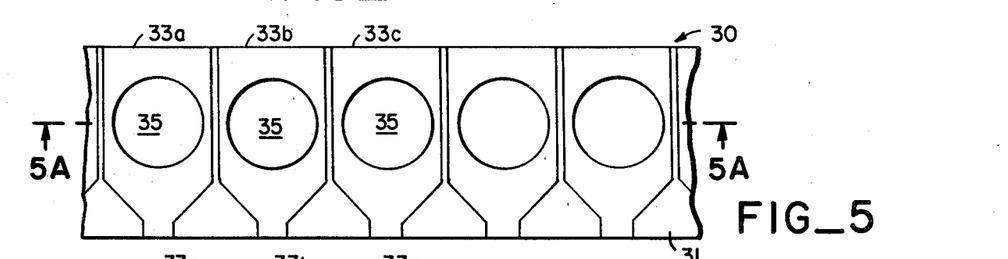
FIG. 5 is a fragmentary plan view and FIG. 5A a fragmentary side cross-sectional view of a line or bar modulating element for modulated aperture electrostatic line printing.
Figure 5A:
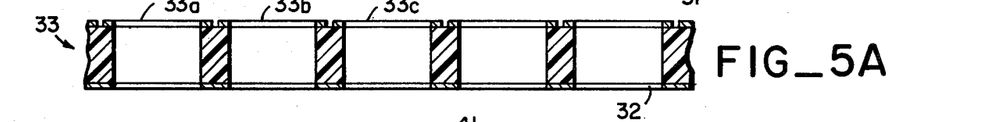
Figure 6:
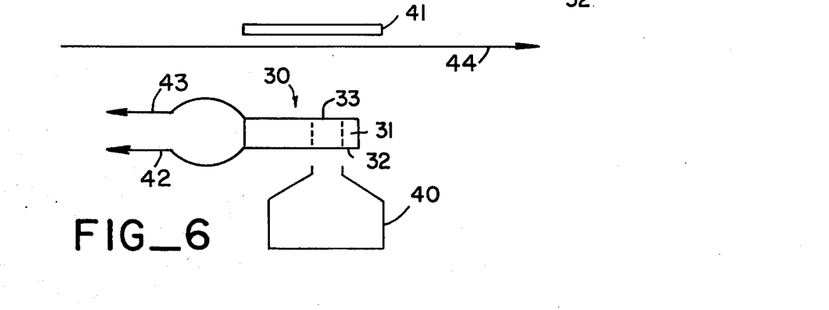
FIG. 6 is a diagrammatic view of a system for modulated aperture electrostatic line printing.

Another type of modulating element for modulated aperture electrostatic line printing is set forth in FIGS. 5 and 5A. The modulating element 30 consists of an elongate length or bar of insulating material 31 having formed along one side a continuous layer of conducting material 32 and having formed along the opposite side a segmented conductive layer 33 consisting of individual insulatively isolated segments 33A, 33B, 33C, etc. The so formed elongate bar is formed with a row of apertures therethrough, each aperture surrounded by a conductive segment 33A, 33B, 33C, etc. An electrical 
lead is provided to the continuous conductive layer 32 for applying a uniform potential across one face of the insulative layer 31 and around one side of each aperture. A plurality of electrical leads are provided one for each of the conductive segments 33A, 33B, 33C, etc., so that a different potential can be applied to each of the segments for building up differing selective charge layers around the other side of each of the apertures 35 in accordance with a pattern to be reproduced. The double layer charge along each side of the insulative layer 31 permits development of electrostatic lines of force or fringing fields within the apertures for controlling the flow of a linear cross-sectional stream of ions directed through the modulating element. A system for electrostatic line printing using the line or bar modulator of FIGS. 5 and 5A is shown in the diagrammatic view of FIG. 6. A toner supply 40 and an accelerating electrode 41 are spaced apart and interconnected with a potential source for charging and accelerating toner particles from the toner source 40 in the direction of the electrode 41. The outlet from the toner source is shaped to provide an elongate or linear cross-sectional stream of toner particles. The modulating element 30 is positioned in the path of the toner flow with a biasing potential applied to the conductive layer 32 via electrical lead 42 and with selected electrical potentials applied to the segmented elements to the segmented layer 33 via the bank of electrical leads 43 which may be addressed for example by appropriate logic circuitry to provide a changing pattern of charges across the segmented layer in accordance with a pattern to be reproduced. The flow of toner particles directed through the apertures of the modulating element is appropriately shaped or modulated in accordance with the pattern to be reproduced and accelerated toward the back electrode 41. A print receiving medium 44 is transported across the modulated toner stream in a space between the modulating element 30 and electrode 41 and the speed of transport of the paper or other print receiving medium 44 is synchronized with the frequency or rate of change of potentials applied to the segmented portions of the segmented layer 33. As an alternative to the continuous line printing described above, other modes of modulated aperture electrostatic line printing are set forth in the U.S. Pat. No. 3,689,935 referred to above.

Figures 7, 8, 9, 10, 11:
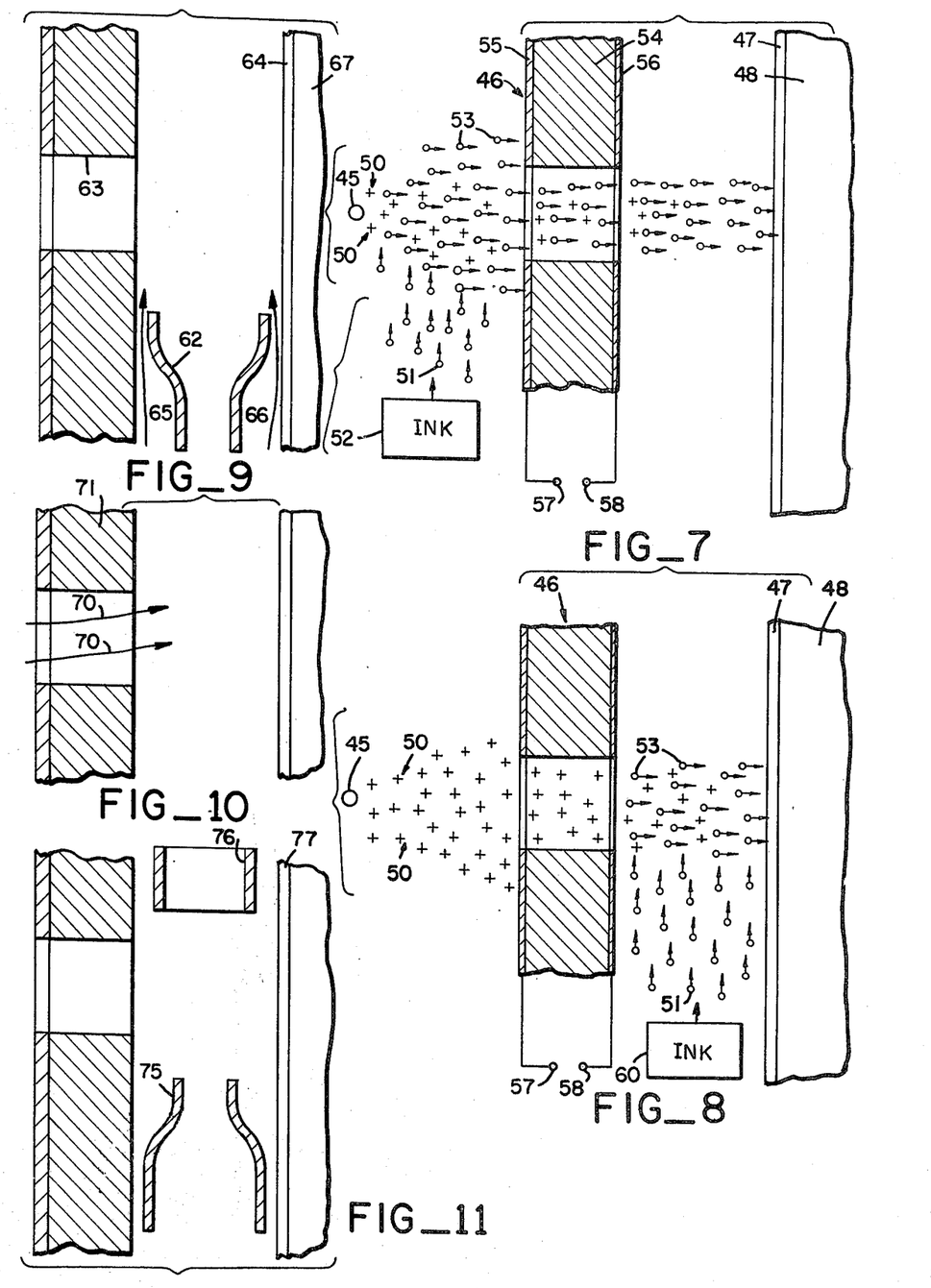
FIG. 7 is a fragmentary side cross-sectional view of a system for modulated aperture electrostatic printing in which a flow of charged particles is modulated.
FIG. 8 is a fragmentary side cross-sectional view of a system for modulated aperture electrostatic printing according to the present invention in which a flow of ions is modulated to impinge on an introduced cloud of marking particles.
FIGS. 9, 10 and 11 are fragmentary side cross-sectional views of variations of the modulated aperture electrostatic printing system illustrated in FIG. 8.
Figure 8A:
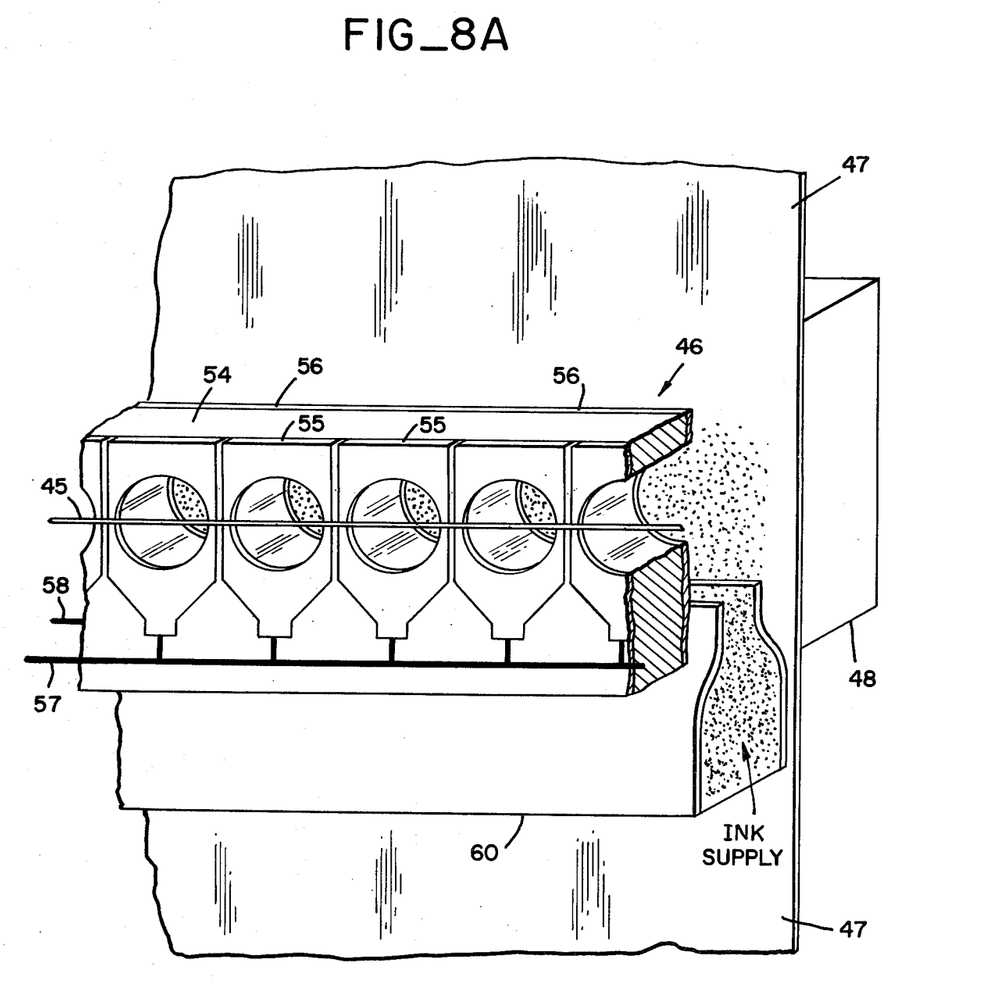
FIG. 8A is a fragmentary perspective view of the system of FIG. 8.
Figure 12:
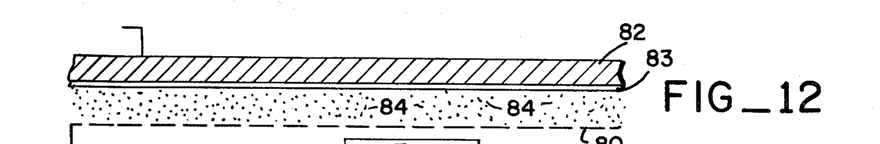
FIG. 12 is a diagrammatic side cross-sectional view of a system for modulated aperture electrostatic printing according to the present invention utilizing a two-dimensional modulated aperture screen.
Figure 13:
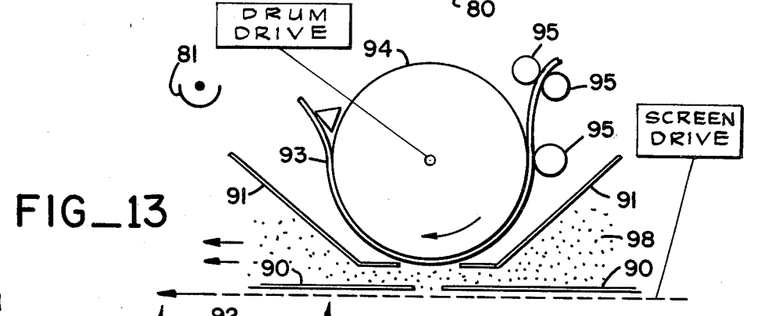
FIG. 13 is a diagrammatic view of another system for modulated aperture electrostatic printing in which the screen is formed in the configuration of a drum or a cylinder.
Figure 14:
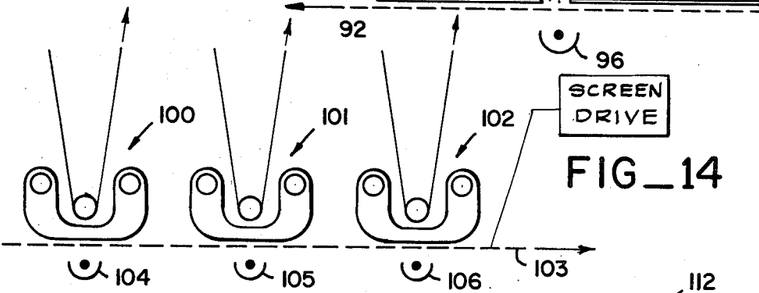
FIG. 14 is a diagrammatic side view of a system with multiple printing stations of the type shown in FIG. 13.
Figure 15:
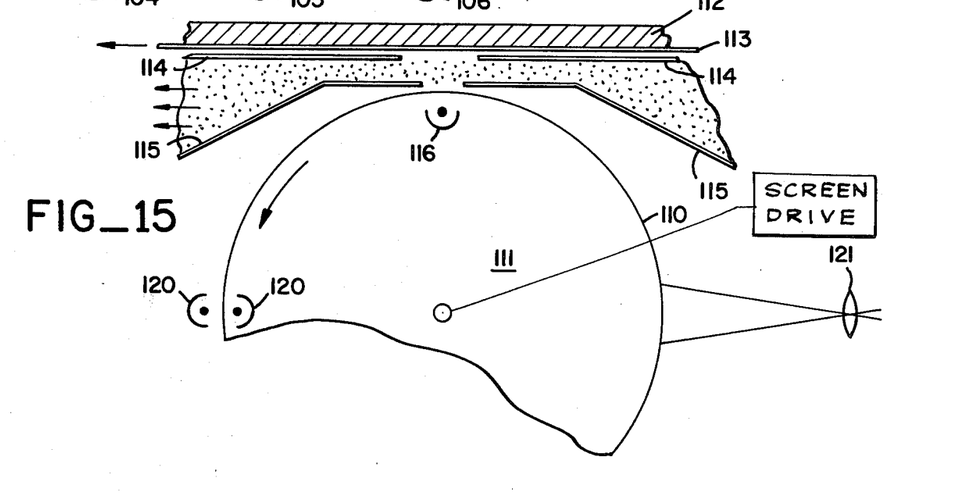
FIG. 15 is a fragmentary diagrammatic view of a system for optically addressing the cylindrical screen to establish the double layer charge electrostatic latent image.

Representative screens and systems for modulated aperture electrostatic printing have been described in the foregoing discussion. Other examples of modulated aperture printing screens and systems are set forth in detail in the patents referred to above. One example of a printing operation of these systems is shown in FIG. 7 with reference to a line modulator of the type shown in FIGS. 5 and 5A. As illustrated in FIG. 7, a corona source 45, particle modulator 46, print receiving medium 47, and accelerating electrode 48 are provided in sequence. The accelerating electrode 48 can itself form the support for the print receiving medium 47. The corona source 45 generates a stream of charged particles 50 which are accelerated toward the back electrode 48 by a suitable potential difference applied between the corona source 45 and electrode 48. Toner marking particles 51 are delivered by a source 52 into the vicinity of the corona emissions and acquire charges. The charged toner particles 53 are thereafter accelerated toward the electrode 48 through the apertures of the line modulator 46. As heretofore described, the modulating element 46 consists of an insulative layer 54 with conductive layers 55 and 56 formed on either side thereof, at least one of which is segmented into insulatively isolated segments surrounding the apertures formed in a row along the modulating element. One or more rows of apertures can be used as set forth in U.S. Pat. No. 3,689,935 referred to above. Potentials applied to the conductive layers over electrical lines 57 and 58 one of which comprises a bank of electrical leads to the segments of the segmented layer selectively develop lines of force within the apertures in accordance with a pattern to be reproduced selectively modulating the flow of toner particles so that the particles come to rest on the print receiving medium 47 in accordance with the pattern to be reproduced.

Alternatively, as described in the above referenced patent, the ion stream itself can be modulated by the modulating element so that the modulated stream of ions impinges upon the print receiving medium 47 in accordance with the pattern to be reproduced. In this arrangement high dielectric paper, for example, is used for the print receiving medium 47 in order to retain the electrostatic latent image deposited by the ions. The paper is thereafter dusted and fixed in accordance with known techniques of electrostatic printing.

B. THE PRESENT INVENTION : IONS INTO AN AEROSOL CLOUD

According to the present invention, a novel system and method for modulated aperture electrostatic printing using screens of the type set forth above is provided. The basis system and method are depicted in FIGS. 8 and 8A in contrast to the arrangement of FIG. 7 with corresponding elements numbered accordingly. Thus, according to the embodiment of the present invention illustrated in FIG. 8 there is provided a corona source 45 modulating element 46 print receiving medium 47 and accelerating electrode 48 in sequence as described with reference to FIG. 7. Corona source 45 generates a stream of ions 50 which are accelerating toward the back electrode 38 through the apertures of modulating element 46. In the example of FIG. 8A, a linear corona source in the form of a wire is shown, but a row of point source or other corona source arrangement may be used. In contrast to the previously developed modulated aperture printing systems and methods described above, and in the patents referred to, the liquid ink particles 51 are introduced by a source 60 into the space between the modulated element 46 and positioned print receiving medium 47. The particles 51 are substantially neutral and form a cloud in the interspace between the modulating element 46 and print receiving medium 47. The ion stream passing through the apertures of the modulating element 46 and modulated according to the array of fields established within the apertures, impinges on the cloud of uncharged particles selectively charging the particles in accordance with the pattern to be reproduced so that the charged particles are accelerated by the electrode 48 to deposit on the print receiving medium 47 in accordance with the pattern to be reproduced. This novel arrangement and method incorporates the advantages of both the toner modulating and ion modulating systems described in the patents referred to above. Thus, because only the ion stream is modulated by the modulating element 46 lower potentials can be used on electrical leads 57 and 58 with higher switching frequencies. Because of the higher transit speed of the ions printing can be conducted at high speeds. Toner loss at the screen or modulated element is avoided as are any cleaning problems. After the ions pass through the apertures of the modulating element they intercept and charge the particles which are then propelled by the accelerating electrostatic field toward the electrode to deposit on the print receiving medium 47. Thus, printing with the marking particles is accomplished directly, rather than first creating an electrostatic latent image on the print receiving medium. Printing can therefore take place on any surface without the necessity of treated or high dielectric paper. Furthermore, because the injected marking particles 51 are neutral, there is little tendency for marking particles to drift and deposit on the printing medium or other apparatus prior to charging by the ion stream. The particles became charged generally only upon impingement of or close proximity to the ion stream 50.

As disclosed in current patent application Ser. No. 101,681, issued as U.S. Pat. No. 3,779,166, it is possible to utilize either liquid aerosol or solid particle toner clouds in the above system. According to the present invention, we have discovered that liquid aerosols are greatly superior to solid particle toner clouds.

By use of the term "liquid aerosol" we refer to aerosol suspensions of liquid marking droplets or particles. The particles should be in a range of about 0.10 microns to 50.0 microns in diameter, and are preferably in the range of 1.0 to 10.0 microns in diameter.

For the liquid aerosol cloud to be considered "substantially uncharged" as that term is used herein, the liquid droplets of particles should have a surface charge density, on the average (i.e. arithmetic mean), of no more than about $1 \times 10^{-6}$ coulombs/m$^2$, and preferably no more than about $5 \times 10^{-7}$ coulombs/m$^2$. Preferred embodiments of the present invention are described herein in conjunction with "uncharged" or "neutral" particles. It will be understood that these illustrations are intended to be equivalent to instance where the parties may have some small amount of charge, but are "substantially uncharged" within the foregoing definition. When liquid inks are employed for the marking material, they are relatively easily atomized without imparting undesirable levels of charge (i.e. in excess of the foregoing limits) to the particles. By comparison, when solid toner particles are employed, the friction resulting from techniques normally utilized to form powder clouds imparts substantially higher levels of charge than in the case of liquid marking materials. These high levels of charge naturally occurring in powder clouds undesirably tend to cause the powder particles to be attracted to the paper or to the walls of the printing apparatus, or to repel one another to disperse the cloud, or to attract one another to form large aggregate particles that drop out of the cloud. It will be appreciated that the average maximum charge tolerated per particle in a substantially uncharged cloud, according to the present invention, is substantially less than the charge imparted to the particles by the modulated ion stream. The following table illustrates the relative magnitudes of preferred maximum limits on average charge per particle in the substantially uncharged cloud, and also as imparted to the particles by ions from the modulated ion stream for printing.

| Particle Diameter Microns | Preferred Maximum Average Charge Per Particle in Cloud Electrons | Charge Imparted to Particle By Ion Impingement Electrons |
|---|---|---|
| 1 | 10 | 400 |
| 5 | 250 | 10,000 |
| 10 | 1000 | 40,000 |
| 20 | 4000 | 160,000 |

Suitable apparatus for forming liquid aerosol clouds in accordance with the present invention include ultrasonic crystal mist generators of the type disclosed in co-pending commonly assigned U.S. patent application Ser. No. 359,286, filed May 11, 1973, entitled "Electrostatic Printing System and Method Using Ions and a Mist of Toner Particles Including Methods and Apparatus for Generating, Delivering, Recovering and Reprocessing the Toner Mist", by Klein et al.

Useful ink compositions include the following:

Composition A
    10 weight percent of solvent black 12
    90 weight percent of perchlorethylene
Composition B
    25 weight percent of solvent violet 8
    75 weight percent of methanol
Composition C
    10 weight percent solvent black 12
    4 weight percent solvent violet 8
    86 weight percent of 1,2-dimethoxyethane.

Solvent black 12 is sold under the trade name "Azo Oil Black" by Allied Chemical Company; and solvent violet 8 is sold under the trade name "Methyl Violet" by American Cyanamid Corporation. The foregoing ink compositions have suitable misting characteristics and soak into the paper quickly upon contact and dry promptly at room temperature.

In order to further prevent any drift of particles toward the print receiving medium prior to charging and to further prevent any drift of particles toward the modulating element or screen, protective "air boundaries" can be injected over the surface of the modulating element and paper as shown in FIG. 9. As shown in that example, the source 62 positioned for delivering in the space between the modulating element 63 and print receiving medium 64 is shaped to define air passageways or channels 65 and 66 along the surface of the modulating element 63 and print receiving medium 64 respectively. Air under slightly higher pressure is delivered via channel 65 and 66 to effectively contain the neutral particles within air boundaries until they become charged by impingement from the ion stream and are accelerated toward electrode 67.

Another approach for preventing drift of uncharged particles into the apertures of the modulating element is illustrated in FIG. 10. According to this arrangement a slight pressure differential is established on either side of the modulating element with the slightly higher pressure on the corona side. As a result, a very small air flow 70 is established through the apertures of the modulating element 71 thereby preventing the cloud from entering the apertures.

By means of the expedients illustrated in FIGS. 9 and 10, a directional velocity parallel to the plane of the printing surface can be imparted to the cloud in a lateral direction between the print receiving medium and 
modulating element. The velocity component imparted to the cloud can be correlated with the speed of transport of the print receiving medium in order to prevent any distortion in the reproduced pattern.

Another arrangement for delivering and picking up marking particles and imparting a controlled lateral velocity component to the cloud is shown in FIG. 11. In that arrangement the source 75 tapers to a narrow delivery outlet while a pick-up channel 76 is positioned across from the source on the other side of the apertures of the screen or modulating element. The pick-up channel 76 is provided with an inlet having a larger diameter than the outlet from the source 75. By means of differential pressures established within the channels 75 and 76, the cloud can be delivered with a controlled lateral component of motion synchronized with the velocity of transport of the print receiving medium 77.

To illustrate the advantage of modulating ions by comparison to toner particles, charged particles are accelerated to a velocity of 15 centimeters per second through a line modulating element having a thickness of 0.25 millimeters. The resulting transit time of 1.6 milliseconds theoretically permits a highest addressing frequency or switching frequency of the potentials applied to the conductive layers of approximately 300 cycles per second. A practical addressing frequency of approximately 100 cycles per second is achieved. The switching rate for controlling ions is greater by a factor of more than 100.

Embodiments of the present invention for modulated aperture electrostatic printing using a screen formed with a two-dimensional array of apertures spaced between an ion source and accelerating electrode are illustrated in FIG. 12 through 15. As shown diagrammatically in FIG. 12, the multilayered apertured screen 80 is interposed between a corona source 81, and accelerating electrode 82 having positioned across its surface a print receiving medium 83. The screen 80 is formed with a two-dimensional array of apertures and at least a conductive layer and an insulative layer capable of supporting charge potentials of differing magnitude on different layers of the screen for establishing electrostatic lines of force within the apertures of the screen for controlling passage of ions in accordance with a pattern to be reproduced as heretofore described. Substantially uncharged liquid ink droplets or particles 84 in the form of an aerosol cloud is introduced into the space between the screen 80 and the print receiving medium 83. A stream of ions originating from corona source 81 in the direction of accelerating electrode 82 intercepts the cloud of neutral particles and the particles become charged and are transported in the direction of the accelerating field. Because the ion flow is modulated as it passes through the apparatus of screen 80 as heretofore described, the toner cloud is selectively charged and the charged particles are attracted to the printing surface 83 by the accelerating electrostatic field in accordance with the pattern to be reproduced. Because the printing takes place over a two-dimensional area, however, problems are encountered in the embodiment illustrated in FIG. 12 in uniformly distributing a cloud of toner particles 84 throughout the space over the surface area to be printed. Non-uniform printing density may result.

In order to overcome this difficulty the invention is embodied in a form so that printing occurs at any instance only over a linear cross-section of the printing surface area even though a two-dimensional screen is utilized. This is accomplished according to one example as shown in FIG. 13. In this arrangement, the printing occurs along a narrow slit defined by baffles 90 while the screen 92 and print receiving medium 93 are transported synchronously across the slit. The paper or other printing surface 93 is transported across the slit by means of a drum support 94, which also serves as the accelerating electrode, and appropriate rollers 95. A stream of ions generated by corona source 96 is accelerated in the direction of the drum passing through the apertures of screen 92. Uncharged ink mist is delivered to the space over the slit defined by baffles 90 in the path of the modulated ion stream through a channel defined by the baffle walls 90 and walls 91 so that the line cross-section ion stream passing through the apertures of screen 92 impinge upon the neutral cloud selectively charging particles in the cloud which are accelerated toward the drum 94 to deposit on the print receiving medium 93 in accordance with the pattern to be reproduced. The linear cross-section stream of ions originating from row corona source 96 is variably modulated as the screen 92 is transported across the ion stream path. The cloud is therefore variably charged and comes to rest on the printing surface 93 in a continuously changing pattern as the paper or other printing surface is transported across the path of charged particles. Continuous line printing can therefore be achieved.

In a preferred embodiment the cloud of ink particles 98 is delivered through the channels defined by walls 90 and 91 with a lateral component of motion in the direction of transport of the screen and printing surface. By this expedient, distortion at the printing surface due to differential velocity between the printing particles and printing surface is avoided. Thus, the velocity component imparted to the cloud in the direction of transport is synchronized with the velocity of transport of the screen and paper or other printing surface.

The paper or other print receiving medium can be either sheet-fed or web-fed. For simultaneous copies on web-fed paper, a system such as that shown in FIG. 14 is provided. In this arrangement multiple printing stations 100, 101 and 102 of the type shown in FIG. 13 produce essentially simultaneous identical copies of the same charge image formed across the two-dimensional multilayered apertured screen 103, except that the continuous line printing occurs simultaneously across different linear cross-sectional portions of the screen 103. The amount of ion current used from the sources 104, 105 and 106 is adjusted to a level so that the screen charge pattern is not discharged and therefore so that three or more images can be printed from the same double layer charge bipolar electrostatic latent image formed on the two-dimensional screen 103. The embodiment of FIG. 14 is particularly suited to computer output applications where web-fed paper is often used.

Another embodiment for the two-dimensional modulated aperture screen system is shown in FIG. 15 in which the screen 110 is formed in the configuration of a drum 111. In this configuration the back electrode 112 which also serves as the carrying element for the paper of other print receiving medium 13 is either flat as illustrated in FIG. 15 or curved as shown in FIG. 13. As in each of the previous embodiment, a substantially uncharged liquid aerosol ink cloud is introduced into the channel defined by baffles 114 and walls 115. The aerosol cloud is again transported across the slit defined by the two sections of the channel to be exposed to the linear cross-section ion stream originating from the corona source 116 positioned inside the drum 111. The ion stream is modulated as it passes through the apertures of the screen 110, which forms the surface of drum 111. The cloud is selectively charged and accelerated toward the electrode 112 so that particles deposit on the print receiving medium 113 in the pattern to be reproduced as the paper or other medium 113 is transported across the path of the charged particles. Continuous line printing is thereby achieved as the ion stream is variably modulated by the rotating drum. Again, a velocity component is preferably imparted to the cloud in the direction of transport, synchronized with the velocity of the transport of the drum surface and printing surface so that printing distortions resulting from differential velocities are avoided.

Problems of printing "smear" are also eliminated by "narrow slit" printing. In this embodiment the width of the slit formed by the two sides of the ink mist delivery channel formed by baffles 114 and walls 115 has an effective width electrostatically as wide as a row of screen apertures formed in the two-dimensional screen. Because the narrow slit is reduced in width to that of one aperture, the relative velocity of paper and screen and ink mist during printing is not critical in obtaining high resolutions. This permits mechanical simplicity to the design of the machine. However, the best performance is obtained when the screen velocity, cloud velocity and paper or other printing medium velocity are all nearly equal. The quantity of liquid aerosol particles in the space between the screen and print receiving medium will then determine the density of the print for a given marking material, and the most uniform inking is then achieved.

In the embodiment of FIG. 15, the double layer charge bipolar electrostatic latent image is established across the screen by optical addressing in the manner heretofore described. In this example, the screen is initially charged uniformly over the surface of a photoconductive insulative layer by means of corona source 120. The charge on the photoconductive insulating layer is thereafter selectively dissipated through the conductive layer which may be, for example, grounded. This is accomplished by imaging, by means of a lens system 121, the light pattern to be reproduced, onto the surface of the photoconductive insulating layer while the conductive layer is for example grounded. A uniform potential is thereafter applied to the conductive layer so that selective fringing fields are established within the apertures of the screen for modulating the ion stream.

While the invention has been fully outlined in the specification and is adapted to fulfill the objects primarily stated, it is to be understood that it is not intended to confine the invention to the particular materials, apparatus and steps disclosed herein, since variations may be provided without departing from the spirit and scope of the invention, such being defined by the appended claims.

We claim:

1. Apparatus for electrostatic printing comprising:

means for generating a directed stream of ions including an ion source and an electrode spaced from said ion source;

means interposed in the ion stream for modulating the ion stream comprising a multilayered apertured modulating element spaced between said ion source and said electrode, said modulating element having at least a conductive layer and an insulative layer capable of supporting charge potentials of differing magnitude for establishing electrostatic lines of force within the apertures of the element for controlling passage of ions to form a modulated ion stream in accordance with a pattern to be reproduced;

means for supporting and positioning a print receiving medium spaced from said modulating element between said modulating element and said electrode;

means for establishing an electrical field between said ion source and said electrode encompassing said modulating element and the print receiving medium;

and means for introducing a cloud of substantially uncharged liquid ink droplets into the path of the modulated ion stream in the space between said modulating element and the positioned print receiving medium, said droplets having an average charge no greater than substantially $5 \times 10^{-7}$ coulombs/m$^2$ whereby the modulated ion stream selectively impinges upon and charges the droplets in the cloud which are propelled by said electrical field and deposited on the print receiving medium in accordance with a pattern to be reproduced.

2. Apparatus as recited in claim 1 wherein the diameter of the average liquid ink droplet in the cloud is in the range from about 1 to about 10 microns.

3. The apparatus of claim 1 wherein said insulative layer is arranged substantially symmetrically to said conductive layer in a plane substantially normal to said electrical field.

4. The apparatus of claim 1 further including means for establishing an air pressure differential from one side of said modulating element to the other side thereof with the lower pressure on the side adjacent the print receiving medium so that a small air flow is established through the apertures of said modulating element to prevent said droplets from entering said apertures.

5. The apparatus of claim 1 further including means for projecting air streams along the region between said modulating element and said print receiving medium to provide air boundaries around the introduced cloud.

6. A method of electrostatic printing on a print receiving medium comprising:

generating an ion stream;

modulating the cross-sectional flow density of ions in the stream in accordance with a pattern to be reproduced to produce a modulated stream of ions;

establishing an ion projection field for propelling the ions of a modulated ion stream thus formed toward the print receiving medium;

and introducing a cloud of substantially uncharged liquid ink droplets having an average charge no greater than substantially $5 \times 10^{-7}$ coulombs/m$^2$ into the path of the modulated ion stream whereby the modulated ion stream selectively impinges upon and charges droplets in the cloud which are deposited on the print receiving medium by said projection field in accordance with a pattern to be reproduced.

7. A method as recited in claim 6 further including the step of limiting the diameter of the average liquid ink droplet in the cloud to the range from about 1.0 to about 10.0 microns.

8. In an apparatus for electrostatic printing including means for generating a directed stream of ions including an ion source and an electrode spaced from said ion source; means interposed in the ion stream for modulating the ion stream comprising a multilayered apertured modulating element spaced between said ion source and said electrode, said modulating element having at least a conductive layer and an insulative layer capable of supporting charge potentials of differing magnitude for establishing electrostatic lines of force within the apertures of the element for controlling passage of ions to form a modulated ion stream in accordance with a pattern to be reproduced; means for supporting and positioning a print receiving medium spaced from said modulating element between said modulating element and said electrode; means for establishing an electrical field between said ion source and said electrode encompassing said modulating element and the print receiving medium; and means for introducing a cloud of marking particles into the path of the modulated ion stream in the space between said modulating element and the positioned print receiving medium so that the modulated ion stream selectively impinges upon and charges the particles in the cloud which are propelled by said electrical field and deposited on the print receiving medium in accordance with a pattern to be reproduced; the improvement wherein said introducing means comprises means for generating a cloud of uncharged liquid ink droplets having an average charge no greater than substantially $5 \times 10^{-7}$ coulombs/m².

9. The combination of claim 8 wherein the diameter of the average liquid ink droplet in said cloud is in the range from about 1 to about 10 microns.

10. In the method of electrostatic printing on a print receiving medium including the steps of generating an ion stream, modulating the cross-sectional flow density of ions in the stream in accordance with a pattern to be reproduced in order to produce a modulated stream of ions, establishing an ion projection field for propelling the ions of a modulated ion stream thus formed toward the print receiving medium, and introducing a cloud of marking particles into the path of the modulated ion stream so that the modulated ion stream selectively impinges upon and charges particles in the cloud which are deposited on the print receiving medium by said projection field in accordance with a pattern to be reproduced; the improvement comprising the step of generating a cloud of substantially uncharged liquid ink droplets having an average charge no greater than substantially $5 \times 10^{-7}$ coulombs/m².

11. The method of claim 10 further including the step of limiting the diameter of the average liquid ink droplet in the cloud to the range from about 1.0 to about 10.0 microns.

* * * * *